(12) United States Patent
Connor et al.

(10) Patent No.: US 8,873,388 B2
(45) Date of Patent: *Oct. 28, 2014

(54) SEGMENTATION INTERLEAVING FOR DATA TRANSMISSION REQUESTS

(71) Applicant: Intel Corporation, Santa Clara, CA (US)

(72) Inventors: Patrick Connor, Portland, OR (US); Linden Cornett, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,315

(22) Filed: Dec. 4, 2012

(65) Prior Publication Data

US 2013/0343184 A1    Dec. 26, 2013

Related U.S. Application Data

(63) Continuation of application No. 11/323,889, filed on Dec. 30, 2005, now Pat. No. 8,325,600.

(51) Int. Cl.
| | |
|---|---|
| H04L 12/26 | (2006.01) |
| H04L 29/08 | (2006.01) |
| H04L 29/06 | (2006.01) |
| H04L 12/863 | (2013.01) |
| H04L 12/801 | (2013.01) |
| H04L 12/54 | (2013.01) |

(52) U.S. Cl.
CPC .............. *H04L 69/166* (2013.01); *H04L 67/28* (2013.01); *H04L 47/193* (2013.01); *H04L 29/08045* (2013.01); *H04L 29/06136* (2013.01); *H04L 47/625* (2013.01); *H04L 12/569* (2013.01)
USPC .......................................................... 370/230

(58) Field of Classification Search
None
See application file for complete search history.

(56) References Cited

U.S. PATENT DOCUMENTS

| | | | |
|---|---|---|---|
| 5,163,046 A | 11/1992 | Hahne et al. | |
| 5,541,919 A | 7/1996 | Yong et al. | |
| 5,802,051 A | 9/1998 | Petersen et al. | |
| 5,937,169 A | 8/1999 | Connery et al. | |
| 6,570,885 B1 | 5/2003 | Gregg | |
| 6,704,315 B1 | 3/2004 | Besset-Bathias | |
| 6,721,335 B1 | 4/2004 | Gregg | |
| 6,721,835 B1 | 4/2004 | Connor | |
| 6,772,227 B2 | 8/2004 | Alkhatib et al. | |
| 6,788,704 B1 * | 9/2004 | Lindsay | 370/465 |
| 6,865,152 B2 | 3/2005 | Luhmann et al. | |
| 7,080,158 B1 | 7/2006 | Squire | |
| 7,139,828 B2 | 11/2006 | Alkhatib et al. | |
| 7,289,517 B1 | 10/2007 | Shimonishi | |
| 7,389,462 B1 * | 6/2008 | Wang et al. | 714/748 |
| 7,526,577 B2 | 4/2009 | Pinkerton et al. | |
| 7,545,810 B2 | 6/2009 | Mynam et al. | |

(Continued)

OTHER PUBLICATIONS

Office Action received for U.S. Appl. No. 11/323,889, mailed on Sep. 25, 2008, 10 pages of Office Action.

(Continued)

*Primary Examiner* — Timothy J Weidner

(57) ABSTRACT

Some embodiments discussed herein may interleave one data transmission request with one or more segments of another data transmission request. In one embodiment, updated context information from a previous segment is used to transmit a next segment.

11 Claims, 4 Drawing Sheets

(56) References Cited

U.S. PATENT DOCUMENTS

| | | |
|---|---|---|
| 7,554,917 B1 | 6/2009 | Tieu |
| 7,594,002 B1 | 9/2009 | Thorpe et al. |
| 7,631,096 B1 | 12/2009 | Yeh et al. |
| 7,656,880 B1 | 2/2010 | Jones |
| 7,831,745 B1 | 11/2010 | Eiriksson et al. |
| 7,839,873 B1 | 11/2010 | Quach et al. |
| 8,325,600 B2 * | 12/2012 | Connor et al. ............. 370/230 |
| 2002/0091863 A1 | 7/2002 | Schug |
| 2003/0031172 A1 | 2/2003 | Grinfeld |
| 2003/0031206 A1 | 2/2003 | Goldstein |
| 2003/0058876 A1 | 3/2003 | Connor et al. |
| 2003/0081624 A1 | 5/2003 | Aggarwal et al. |
| 2003/0110286 A1 | 6/2003 | Antal et al. |
| 2003/0115338 A1 * | 6/2003 | Jayam et al. ............... 709/228 |
| 2003/0118052 A1 | 6/2003 | Kuhl et al. |
| 2004/0042458 A1 * | 3/2004 | Elzu ........................... 370/394 |
| 2004/0111532 A1 | 6/2004 | Connor |
| 2004/0258075 A1 * | 12/2004 | Sidenblad et al. ........ 370/395.5 |
| 2004/0264433 A1 | 12/2004 | Melpignano |
| 2005/0147126 A1 | 7/2005 | Qiu et al. |
| 2005/0213603 A1 | 9/2005 | Karighattam et al. |
| 2006/0274787 A1 * | 12/2006 | Pong ........................... 370/469 |
| 2006/0288128 A1 | 12/2006 | Moskalev et al. |
| 2008/0304483 A1 | 12/2008 | Williams et al. |
| 2009/0268632 A1 | 10/2009 | Pabari et al. |
| 2010/0235465 A1 | 9/2010 | Thorpe et al. |
| 2010/0329263 A1 | 12/2010 | Tischer et al. |

OTHER PUBLICATIONS

Office Action received for U.S. Appl. No. 11/323,889, mailed on Dec. 22, 2009, 15 pages of Office Action.
Office Action received for U.S. Appl. No. 11/323,889, mailed on Jan. 28, 2011, 20 pages of Office Action.
Final Office Action received for U.S. Appl. No. 11/323,889, mailed on Jun. 12, 2009, 11 pages of Office Action.
Final Office Action received for U.S. Appl. No. 11/323,889, mailed on Aug. 9, 2010, 13 pages of Office Action.
Final Office Action received for U.S. Appl. No. 11/323,889, mailed on Sep. 6, 2011, 21 pages of Office Action.
Notice of Allowance received for U.S. Appl. No. 11/323,889, mailed on Aug. 1, 2012, 6 pages.

* cited by examiner

SEGMENTATION INTERLEAVING FOR DATA TRANSMISSION REQUESTS

RELATED APPLICATIONS

This application is a continuation of U.S. patent application Ser. No. 11/323,889 entitled "SEGMENTATION INTERLEAVING FOR DATA TRANSMISSION REQUESTS," filed Dec. 30, 2005, issued as U.S. Pat. No. 8,325,600 on Dec. 4, 2012, which is incorporated herein by reference and for all purposes.

BACKGROUND

Networking has become an integral part of computer systems. To improve networking performance, datacenter server clusters used in high performance computing (HPC) generally aim for a communication interconnect technology that can support two goals: (1) deliver bulk data with high throughput and low processor utilization, and (2) deliver other packets with lower latency than the bulk data.

These two goals can be at odds. In particular, optimizations for increasing throughput may add latency by batching packet transfers, for example, to increase efficiency. On the other hand, low latency optimizations may require packets to be processed immediately, which may in turn disallow the packets from being batched and, more specifically, disallowing the packets from being queued behind existing batches.

One throughput optimization technique that is used in some Ethernet controllers is TCP (transmission control protocol) segmentation offloading (TSO) which attempts to unburden the server by moving processor-intensive networking tasks off the server and onto the adapter card. This technique may increase the throughput in some situations; however, it may also make it more difficult for low latency packets to bypass larger operations associated with TSO.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Figure 1:
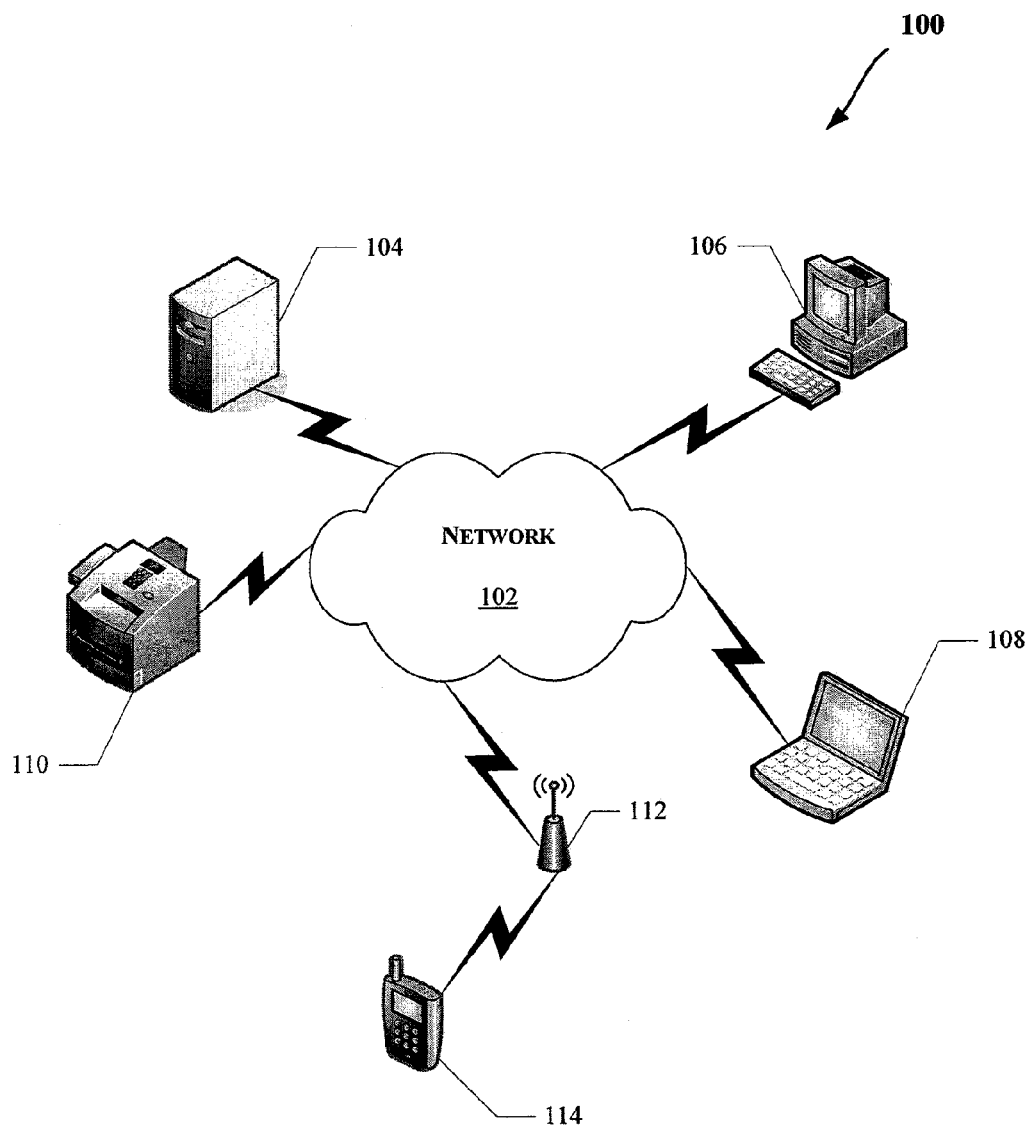
FIG. 1 illustrates various components of an embodiment of a networking environment, which may be utilized to implement various embodiments discussed herein.

Some embodiments discussed herein may interleave one data transmission request with one or more segments of another data transmission request, such as discussed with reference to FIGS. 1-4. In particular, FIG. 1 illustrates various components of an embodiment of a networking environment 100, which may be utilized to implement various embodiments discussed herein. The environment 100 may include a network 102 to enable communication between various devices such as a server computer 104, a desktop computer 106 (e.g., including a workstation computer), a laptop (or notebook) computer 108, a reproduction device 110 (e.g., a network printer, copier, facsimile, scanner, all-in-one device, or the like), a wireless access point 112, a personal digital assistant or smart phone 114, a rack-mounted computing system (not shown), or other devices. The network 102 may be any type of a network capable of communicating data between one or more devices, including an intranet, the Internet, and/or combinations thereof.

In an embodiment, the devices 104-114 may communicate with the network 102 through wired and/or wireless connections. Additionally, the network 102 may be a wired and/or wireless network. For example, as illustrated in FIG. 1, the wireless access point 112 may be coupled to the network 102 to enable other wireless-capable devices (such as the device 114) to communicate with the network 102. In one embodiment, the wireless access point 112 may include traffic management capabilities. Also, data communicated between the devices 104-114 may be encrypted (or cryptographically secured), e.g., to limit unauthorized access.

The network 102 may utilize any communication protocol such as Ethernet, Fast Ethernet, Gigabit Ethernet (including 10 Gigabit Ethernet (10 GbE), e.g., complying with Institute of Electrical & Electronics Engineers (IEEE) Standard 802.3ae-2002, June 2002), wide-area network (WAN), fiber distributed data interface (FDDI), Token Ring, leased line, analog modem, digital subscriber line (DSL and its varieties such as high bit-rate DSL (HDSL), integrated services digital network DSL (IDSL), or the like), asynchronous transfer mode (ATM), cable modem, and/or FireWire.

Wireless communication through the network 102 may be in accordance with one or more of the following: wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), or the like. Moreover, network communication may be established by internal network interface devices (e.g., present within the same physical enclosure as a computing system) or external network interface devices (e.g., having a separate physical enclosure and/or power supply than the computing system to which it is coupled) such as a network interface card (NIC).

Figure 2:
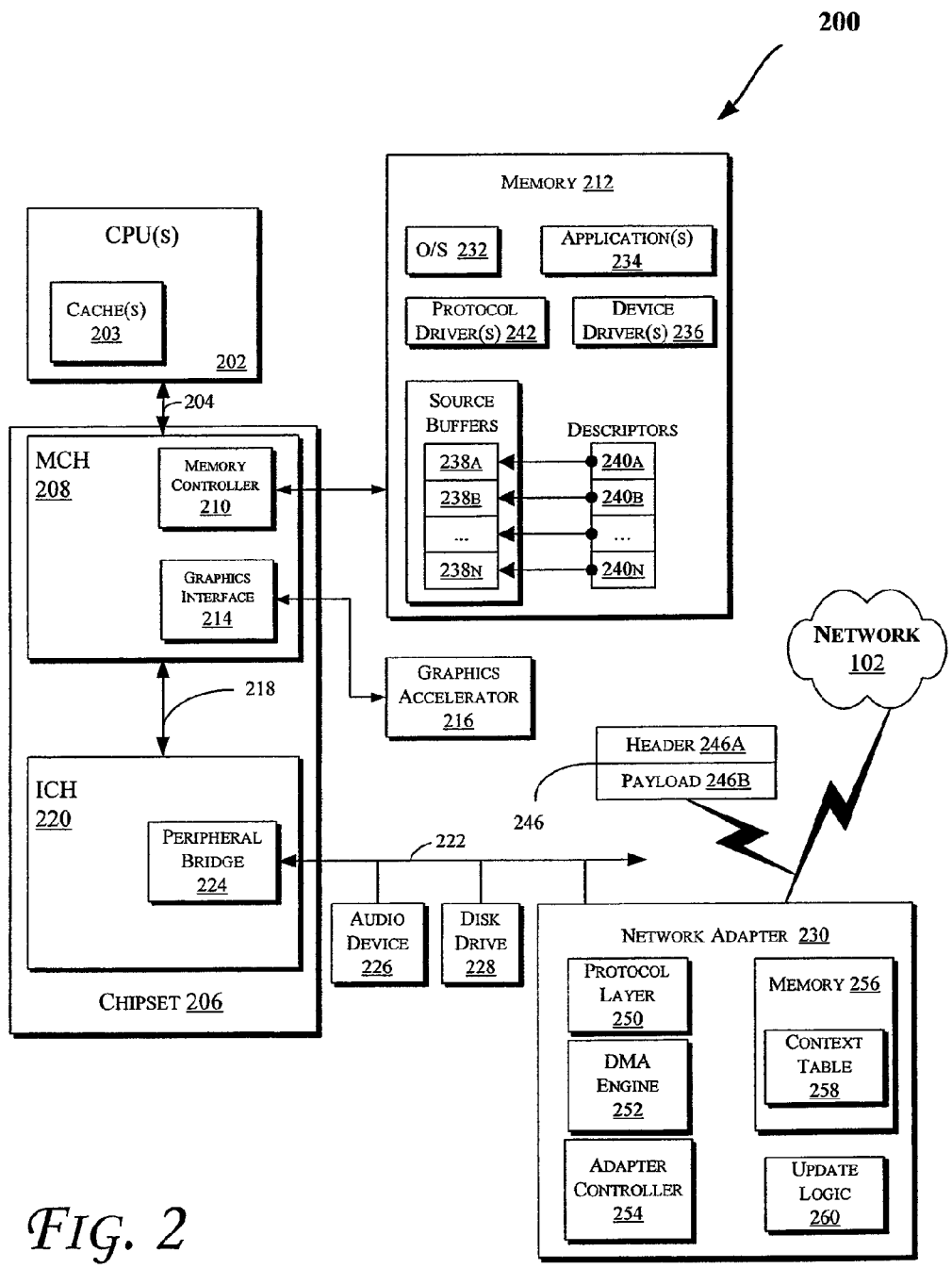
FIGS. 2 and 4 illustrate block diagrams of embodiments of computing systems, which may be utilized to implement various embodiments discussed herein.

FIG. 2 illustrates a block diagram of an embodiment of a computing system 200. In various embodiments, one or more of the devices 104-114 discussed with reference to FIG. 1 may include the computing system 200. The computing system 200 may include one or more central processing unit(s) (CPUs) 202 or processors (generally referred to herein as "processors 202" or more generally as "processor 202") coupled to an interconnection network (or bus) 204. The processors (202) may include any type of a processor such as a general purpose processor, a network processor, or the like (including a reduced instruction set computer (RISC) processor or a complex instruction set computer (CISC)). Moreover, the processors (202) may have a single or multiple core design. The processors (202) with a multiple core design may integrate different types of processor cores on the same integrated circuit (IC) die. Also, the processors (202) with a multiple core design may be implemented as symmetrical or asymmetrical multiprocessors.

The processor 202 may include one or more caches (203), which may be shared in one embodiment of the invention. Generally, a cache stores data corresponding to original data stored elsewhere or computed earlier. To reduce memory access latency, once data is stored in a cache (e.g., the cache 203), future use may be made by accessing a cached copy rather than refetching or recomputing the original data. The cache 203 may be any type of cache, such a level 1 (L1) cache, a level 2 (L2) cache, a last level cache (LLC), or other types of cache that are capable of storing data (including instructions) that are utilized by one or more components of the system 200.

A chipset 206 may additionally communicate with the interconnection network 204. The chipset 206 may include a memory control hub (MCH) 208. The MCH 208 may include a memory controller 210 that communicates with a memory 212. The memory 212 may store data (including sequences of instructions) that are executed by the processor 202, or any other device included in the computing system 200. Moreover, the cache(s) 203 may cache data that is stored in the memory 212. In one embodiment of the invention, the memory 212 may include one or more volatile storage (or memory) devices such as random access memory (RAM), dynamic RAM (DRAM), synchronous DRAM (SDRAM), static RAM (SRAM), or other types of memory. Nonvolatile memory may also be utilized such as a hard disk. Additional devices may be coupled to the interconnection network 204, such as multiple processors and/or multiple system memories.

The MCH 208 may additionally include a graphics interface 214 to communicate with a graphics accelerator 216. In one embodiment, the graphics interface 214 may be coupled to the graphics accelerator 216 via an accelerated graphics port (AGP). In an embodiment of the invention, a display device (such as a flat panel display device) may be coupled to the graphics interface 214 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

As illustrated in FIG. 2, a hub interface 218 may allow the MCH 208 to communicate with an input/output control hub (ICH) 220. The ICH 220 may provide an interface to input/output (I/O) devices coupled to the computing system 200. The ICH 220 may communicate with a bus 222 through a peripheral bridge (or controller) 224, such as a peripheral component interconnect (PCI) bridge, a universal serial bus (USB) controller, or the like. The bridge 224 may provide a data path between the processor 202 and peripheral devices. Other types of topologies may be utilized.

Furthermore, multiple buses may be coupled to the ICH 220, e.g., through multiple bridges or controllers. For example, the bus 222 may comply with the PCI Local Bus Specification, Revision 3.0, Mar. 9, 2004, available from the PCI Special Interest Group, Portland, Oreg., U.S.A. (hereinafter referred to as a "PCI bus"). Alternatively, the bus 222 may include a bus that complies with the PCI-X Specification Rev. 2.0a, Apr. 23, 2003, (hereinafter referred to as a "PCI-X bus"), available from the aforesaid PCI Special Interest Group, Portland, Oreg., U.S.A. Additionally, the bus 222 may include a bus that complies with the PCI Express Specification Rev. 1.0a, June 2005 (hereinafter referred to as a "PCIe bus"), available from the aforesaid PCI Special Interest Group, Portland, Oreg., U.S.A. Also, the bus 222 may include other types and configurations of bus systems. Moreover, other peripherals coupled to the ICH 220 may include, in various embodiments of the invention, integrated drive electronics (IDE) or small computer system interface (SCSI) hard drive(s), USB port(s), a keyboard, a mouse, parallel port(s), serial port(s), floppy disk drive(s), or digital output support (e.g., digital video interface (DVI)).

As shown in FIG. 2, the bus 222 may communicate with an audio device 226, one or more disk drive(s) 228, and a network adapter 230. Other devices may be coupled to the bus 222. Also, various components (such as the network adapter 230) may be coupled to the MCH 208 in some embodiments of the invention. In addition, the processor 202 and the MCH 208 may be combined to form a single IC chip. Furthermore, the graphics accelerator 216 may be included within the MCH 208, in other embodiments of the invention.

In one embodiment, the computing system 200 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 228), a floppy disk, a compact disk ROM (CD-ROM), a digital versatile disk (DVD), flash memory, a magneto-optical disk, or other types of nonvolatile machine-readable media capable of storing electronic data (including instructions).

The memory 212 may include one or more of the following in an embodiment: an operating system (O/S) 232, application(s) 234 (generally referred to herein as "application 234"), device driver(s) 236 (generally referred to herein as "device driver 236"), buffers 238A through 238N (generally referred to herein as "buffers 238"), descriptors 240A through 240N (generally referred to herein as "descriptors 240"), and protocol driver(s) 242 (generally referred to herein as "protocol driver 242"). Programs and/or data in the memory 212 may be swapped into the disk drive 228 as part of memory management operations. The application(s) 234 may execute (on the processors 202) to communicate one or more packets (246) with one or more computing devices coupled to the network 102 (such as the devices 104-114 of FIG. 1). In an embodiment, a packet may be a sequence of one or more symbols and/or values that may be encoded by one or more electrical signals transmitted from at least one sender to at least on receiver (e.g., over a network such as the network 102). For example, each packet 246 may have a header 246A that includes various information that may be utilized in routing and/or processing the packet 246, such as a source address, a destination address, packet type, etc. Each packet may also have a payload 246B that includes the raw data (or content) the packet 246 is transferring between various computing devices (e.g., the devices 104-114 of FIG. 1) over a network (such as the network 102). As will be further discussed with reference to FIG. 3, various context data included in a packet header (246A) may be utilized for some segments of a data transmission request in an embodiment.

In an embodiment, the application 234 may utilize the O/S 232 to communicate with various components of the system 200, e.g., through the device driver 236. Hence, the device driver 236 may include network adapter (230) specific commands to provide a communication interface between the O/S 232 and the network adapter 230. For example, the device driver 236 may allocate one or more source buffers (238) to store data, such as data corresponding to the packet header 246A and/or payload 246B. One or more descriptors (240)

may respectively point to the source buffers 238. A protocol driver 242 may process packets sent over the network 102, according to one or more protocols.

In one embodiment, the O/S 232 may include a protocol stack that provides the protocol driver 242. A protocol stack generally refers to a set of procedures or programs that may be executed to process packets sent over a network (102), where the packets may conform to a specified protocol. For example, TCP/IP (transmission control protocol/Internet protocol) packets may be processed using a TCP/IP stack. The device driver 236 may indicate the source buffers 238 to the protocol driver 242 for processing, e.g., via the protocol stack. The protocol driver 242 may either copy the buffer content (238) to its own protocol buffer (not shown) or use the original buffer(s) (238) indicated by the device driver 236. In one embodiment, the data stored in the buffers 238 may be sent over the network 102, as will be further discussed with reference to FIG. 3.

As shown in FIG. 2, the network adapter 230 may include a (network) protocol layer 250 for implementing the physical communication layer to send and receive packets to and from remote devices over the network 102. The network 102 may include any type of a network such as those discussed with reference to FIG. 1. The network adapter 230 may further include a DMA engine 252, which may read packets from buffers (238) assigned to available descriptors (240). Additionally, the network adapter 230 may include a network adapter controller 254, which includes hardware (e.g., logic circuitry) and/or a programmable processor to perform adapter related operations. In an embodiment, the adapter controller 254 may be a MAC (media access control) component.

The network adapter 230 may further include a memory 256, such as any type of volatile/nonvolatile memory. The memory 256 may include a context table 258, e.g., to store context data or information corresponding to packet header that is provided by the device driver 236. For example, the device driver 236 may generate information corresponding to a packet that is to be transmitted via the network adapter 230 and store the corresponding header (246A) and payload (246B) data in buffers 238. In an embodiment, the context table 258 may store context information such as data corresponding to a TCP (transmission control protocol) sequence number and/or an IP (Internet protocol) identification field. The network adapter 230 may further include an update logic 260 to update the context information stored in the context table 258, as will be further discussed with reference to FIG. 3. Even though in the embodiment illustrated in FIG. 2, the update logic 260 is included within the network adapter 230, the update logic 260 may be located elsewhere in the system 200.

Figure 3:
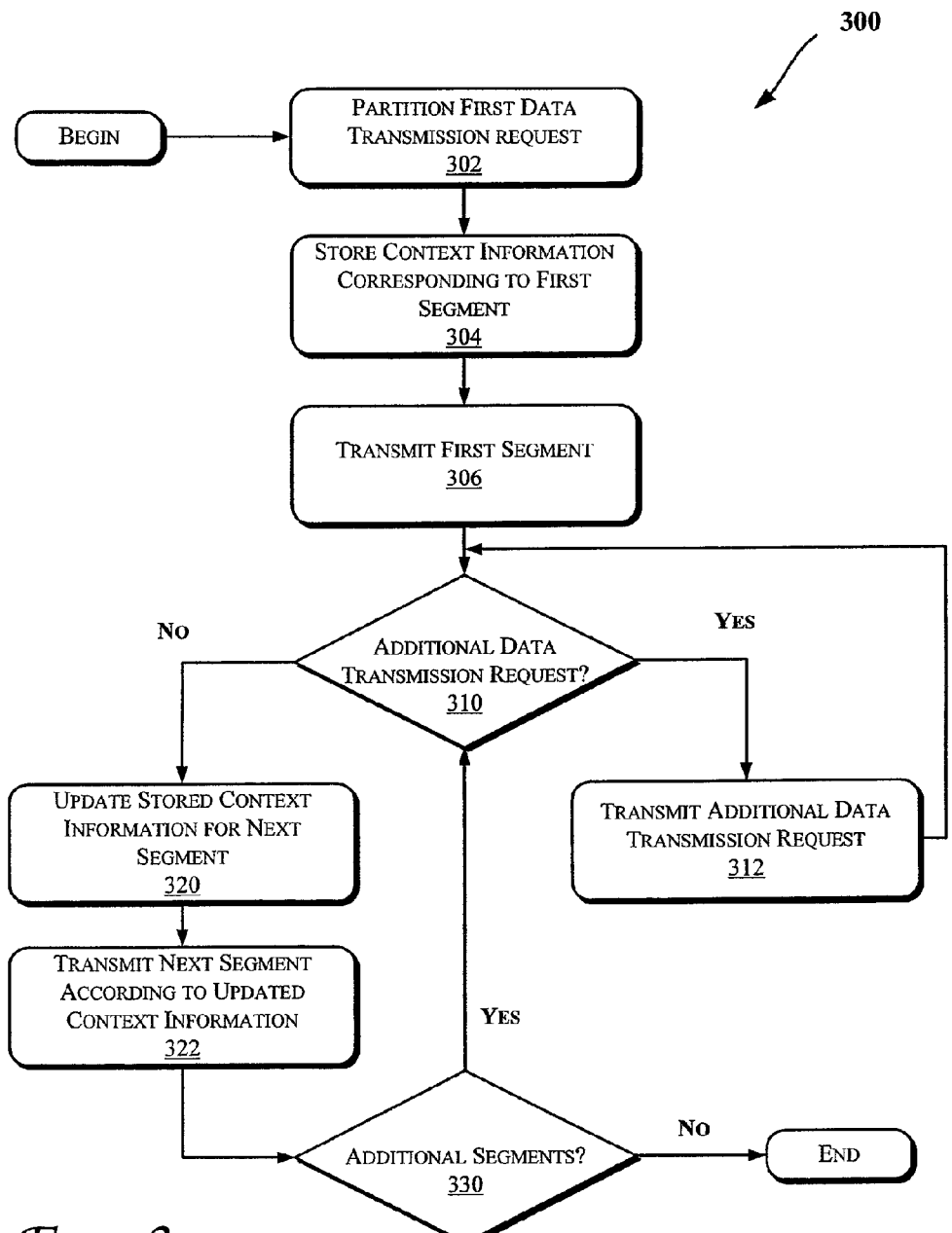
FIG. 3 illustrates a block diagram of an embodiment of a method to interleave one or more segments of a first data transmission request with a second data transmission request.

FIG. 3 illustrates a block diagram of an embodiment of a method 300 to interleave one or more segments of a first data transmission request with a second data transmission request. In an embodiment, various components discussed with reference to FIGS. 2 and 4 may be utilized to perform one or more of the operations discussed with reference to FIG. 3.

Referring to FIGS. 1-3, the method 300 starts with an operation 302 at which the device driver 236 may partition a first data transmission request into a plurality of segments. In an embodiment, the first data transmission request may be a TCP (transmission control protocol) segmentation offloading (TSO) data transmission request. The plurality of segments may have any size and, in an embodiment, each segment may be the same size that may be equal to the page size utilized by the computing system 200, e.g., 4 kB (kilo bytes), 8 kB, 16 kB, 32 kB, 64 kB, 128 kB, 256 kB, or another size. In one embodiment the segments may correspond to packet payload data (e.g., such as data stored in the buffers 238) that is to be transmitted by the network adapter 230 over the network 102.

In an embodiment, such as discussed with reference to FIG. 2, the device driver 326 may store context information (in addition to packet payload data) in the source buffers 238. The device driver 326 may then inform the network adapter 230 of data awaiting transmission by the network adapter 230. For example, the network adapter 230 may include a register (or a variable stored in the memory 256) that is mapped to a location in the memory 212. The device driver 326 may write to this location to inform the network adapter 230 of the pending data. In an embodiment, the adapter controller 254 may, in turn, inform the DMA engine 252 of the pending data. The DMA engine 252 may retrieve the data (e.g., pointed to by the descriptors 240) from the memory 212 and store it in the memory 256. The data stored in the memory 256 may include context information, such as discussed with reference to FIG. 2. As a result, context information corresponding to a first segment of the first data transmission request may be stored in the context table 258 at an operation 304. The network adapter 230 may transmit the first segment over the network 102 at an operation 306.

At an operation 310, the device driver 236 may determine whether an additional (e.g., a second) pending data transmission request should be interleaved with segments of the first data transmission request for transmission via the network adapter 230. The additional data transmission request may be any type of a transmission request such as a low-latency (or latency-sensitive) data transmission request. In an embodiment, the first data transmission request may be stored in a different buffer of the memory 212 than the additional data transmission request. In various embodiments, the device driver 236 may perform the operation 310 in accordance with various considerations such as reduction of traffic congestion over the network 102 or within the system 200, fairness arbitration between buffers 238, quality of service considerations, priority assigned to various data transmission requests (e.g., by various components discussed with reference to system 200 such as application(s) 234), or combinations thereof.

If the device driver 236 determines that the additional (e.g., a second) data transmission request should be interleaved (e.g., transmitted prior to a last segment of the first data transmission request), at an operation 312, the device driver 236 may provide the additional data transmission request to the network adapter 230 for transmission over the network 102 by the network adapter 230, such as discussed with reference to FIG. 2.

Once the device driver 236 determines that no additional data transmission requests remain to be interleaved with segments of the first data transmission request (310), the update logic 260 may access (e.g., read) the context table 258 to update (320) the stored context information for the next segment of the first data transmission request of operation 302. In one embodiment, the device driver 236 may inform the network adapter 230 of whether a given segment is the first segment and, hence, the update logic 260 may not update the stored context information. For example, the device driver 236 may inform the update logic 260 via context or header information (or other indicia including one or more bits) that correspond to a segment sent to the network adapter 230 for transmission.

In an embodiment, the update logic 260 may update the stored context information corresponding to a previous segment, including header information such as the TCP sequence number and/or the IP identification field, as discussed with reference to FIG. 2. At an operation 322, the network adapter 230 transmits the next segment according to the updated context information. After operation 322, if no remaining segments of the first data transmission request remain (330), e.g., the device driver 236 sends a different TSO transmission request to the network adapter 230, the method 300 terminates. Otherwise, if the network adapter 230 receives other segments that correspond to the first data transmission request (330), the method 300 resumes at the operation 310.

Figure 4:
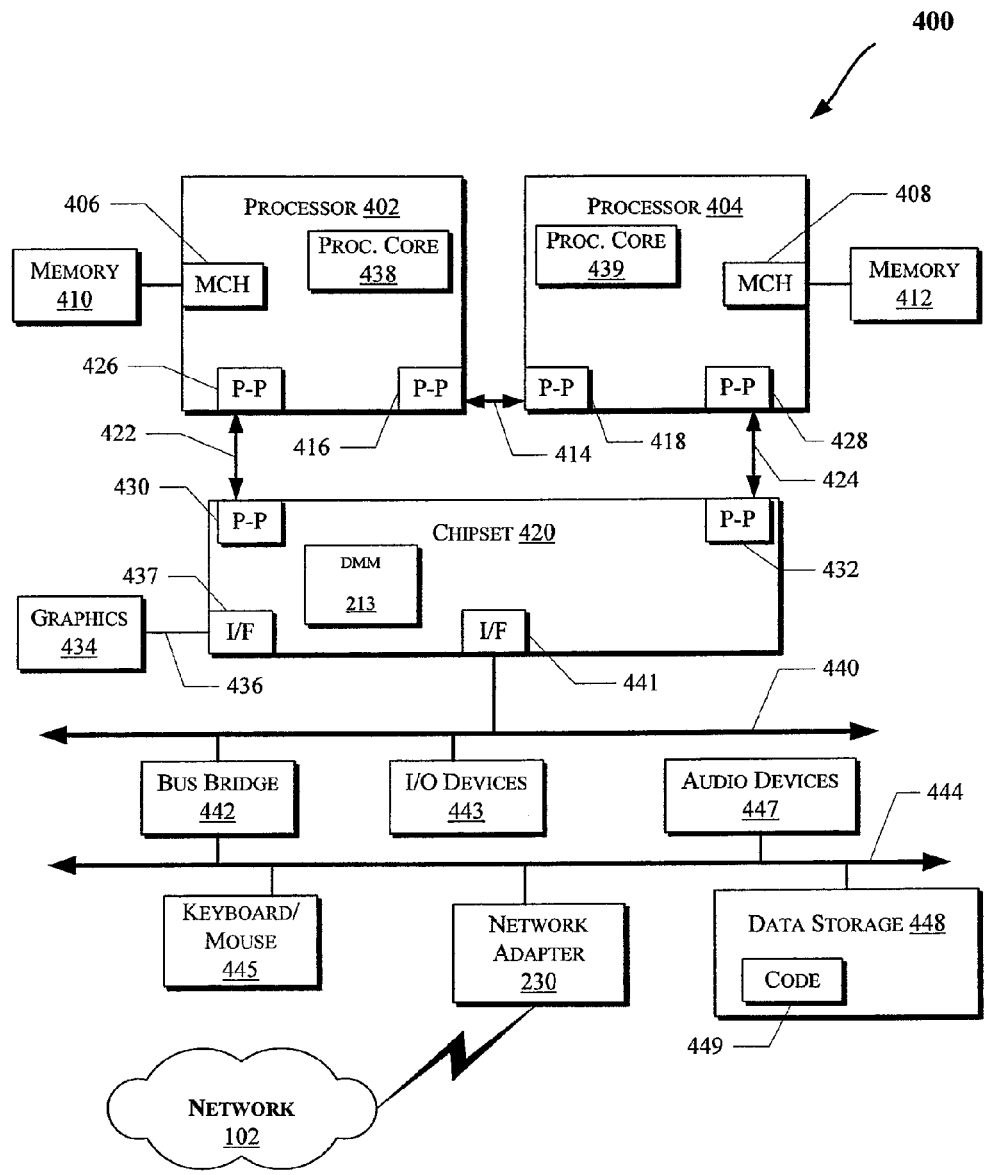

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point-to-point interfaces. One or more of the devices 104-114 discussed with reference to FIG. 1 may include the system 400. Also, the operations discussed with reference to FIGS. 2-3 may be performed by one or more components of the system 400.

As illustrated in FIG. 4, the system 400 may include several processors, of which only two, processors 402 and 404 are shown for clarity. The processors 402 and 404 may each include a local memory controller hub (MCH) 406 and 408 to couple with memories 410 and 412. The memories 410 and/or 412 may store various data such as those discussed with reference to the memory 212 of FIG. 2. For example, each of the memories 410 and/or 412 may include one or more of the O/S 232, application 234, drivers 236 and 242, buffers 238, and/or descriptors 240.

The processors 402 and 404 may be any type of a processor such as those discussed with reference to the processors 202 of FIG. 2. The processors 402 and 404 may exchange data via a point-to-point (PtP) interface 414 using PtP interface circuits 416 and 418, respectively. The processors 402 and 404 may each exchange data with a chipset 420 via individual PtP interfaces 422 and 424 using point to point interface circuits 426, 428, 430, and 432. The chipset 420 may also exchange data with a high-performance graphics circuit 434 via a high-performance graphics interface 436, using a PtP interface circuit 437. Some embodiments of the invention may be distributed throughout several circuits, logic units, or devices illustrated in FIG. 4.

The chipset 420 may be coupled to a bus 440 using a PtP interface circuit 441. The bus 440 may have one or more devices coupled to it, such as a bus bridge 442 and I/O devices 443. Via a bus 444, the bus bridge 443 may be coupled to other devices such as a keyboard/mouse 445, the network adapter 230 (such as modems, network interface devices, or other network communication device), audio I/O device, and/or a data storage device 448. The data storage device 448 may store code 449 that may be executed by the processors 402 and/or 404. The packet 246 may also be received through the I/O devices 443, or other devices coupled to the chipset 420.

In various embodiments, one or more of the operations discussed herein, e.g., with reference to FIGS. 1-4, may be implemented as hardware (e.g., logic circuitry), software, firmware, or combinations thereof, which may be provided as a computer program product, e.g., including a machine-readable or computer-readable medium having stored thereon instructions used to program a computer to perform operations discussed herein. The machine-readable medium may include any type of a storage device such as those discussed with reference to FIGS. 2 and 4. For example, the device driver 236 may operate in accordance with software (e.g., application(s) 234) stored in the memory 212 and executed by the processors 202. Also, the network adapter 230 (and its components such as the update logic 260) may operate in accordance with firmware. Alternatively, the network adapter 230 may include a processor (such as a processor similar to the processors 202) that executes the operations discussed with reference to FIG. 3.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with that embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
based on a segmentation offload request issued by a protocol stack for offloading segmentation to a network adaptor of a first Transmission Control Protocol (TCP) segment of data to be transmitted:
segmenting the first TCP segment of data into multiple TCP segments for transmission, each of the multiple TCP segments having a respective TCP segment header, at least a TCP sequence number in each of the respective TCP segment headers being determined by the network adaptor as a part of the segmentation offload; and
initiating transmission of the multiple TCP segments by the network adaptor;
based on a request issued by the protocol stack to transmit a second TCP segment having a second TCP segment header, the request to transmit the second TCP segment not being a segmentation offload request, determining whether to interleave transmission of the second TCP segment with transmission of the multiple TCP segments; and
based on the determining whether to interleave transmission of the second TCP segment with transmission of the multiple TCP segments, causing transmission of the second TCP segment by the network adaptor after a first of the multiple TCP segments has been transmitted by the network adaptor but before a last of the multiple TCP segments has been transmitted by the network adaptor.

2. The method of claim 1, wherein the determining whether to interleave transmission of the second TCP segment with transmission of the multiple TCP segments comprises determining based on a latency requirement of the second TCP segment.

3. The method of claim 1, further comprising maintaining and updating a context for the segmentation offload of the first TCP segment of data, the context comprising a TCP sequence number.

4. A network adaptor, comprising:
a Direct Memory Access (DMA) engine to access a memory;
a bus interface to enable the DMA engine to access the memory;
a media access controller (MAC);
at least one physical interface to a network; and
circuitry to:
based on a segmentation offload request issued by a protocol stack for offloading segmentation to the network adaptor of a first Transmission Control Protocol (TCP) segment of data to be transmitted:
segment the first TCP segment of data into multiple TCP segments for transmission, each of the multiple TCP segments having a respective TCP segment header, at least a TCP sequence number in each of the respective TCP segment headers being determined by the network adaptor as a part of the segmentation offload; and
initiate transmission of the multiple TCP segments by the network adaptor;
based on a request issued by the protocol stack to transmit a second TCP segment having a second TCP segment header, the request to transmit the second TCP segment not being a segmentation offload request, determine whether to interleave transmission of the second TCP segment with transmission of the multiple TCP segments; and
based on the determination whether to interleave transmission of the second TCP segment with transmission of the multiple TCP segments, cause transmission of the second TCP segment after a first of the multiple TCP segments has been transmitted by the network adaptor but before a last of the multiple TCP segments has been transmitted by the network adaptor.

5. The network adaptor of claim 4, wherein the determination whether to interleave transmission of the second TCP segment with transmission of the multiple TCP segments comprises a determination based on a latency requirement of the second TCP segment.

6. The network adaptor of claim 4, further comprising circuitry to maintain and update a context for the segmentation offload of the first TCP segment of data, the context comprising a TCP sequence number.

7. A storage device to store instructions that when executed on a processor configure the processor to:
based on a segmentation offload request issued by a protocol stack for offloading segmentation to a network adaptor of a first Transmission Control Protocol (TCP) segment of data to be transmitted,
cause segmentation of the first TCP segment of data into multiple TCP segments for transmission, each of the multiple TCP segments having a respective TCP segment header, at least a TCP sequence number in each of the respective TCP segment headers being determined by the network adaptor as a part of the segmentation offload; and
cause initiation of transmission of the multiple TCP segments by the network adaptor;
based on a request issued by the protocol stack to transmit a second TCP segment having a second TCP segment header, the request to transmit the second TCP segment not being a segmentation offload request, cause a determination whether to interleave transmission of the second TCP segment with transmission of the multiple TCP segments; and
based on the determination whether to interleave transmission of the second TCP segment with transmission of the multiple TCP segments, cause transmission of the second TCP segment after a first of the multiple TCP segments has been transmitted by the network adaptor but before a last of the multiple TCP segments has been transmitted by the network adaptor.

8. The storage device of claim 7, wherein the instructions to cause a determination whether to interleave transmission of the second TCP segment with transmission of the multiple TCP segments comprise instructions to cause a determination based on a latency requirement of the second TCP segment.

9. An apparatus, comprising
a network adapter, comprising:
a Direct Memory Access (DMA) engine;
a bus interface;
a media access controller (MAC);
at least one physical interface to a network; and
circuitry capable to:
receive a first data transmission request;
initiate Transmission Control Protocol (TCP) segmentation offload for the first data transmission request and cause transmission, via a one of the at least one physical interfaces to a network, of at least a first TCP segment of data of multiple TCP segments of data for the first data transmission request, each of the multiple TCP segments of data having a respective TCP segment header, at least a TCP sequence number in each of the respective TCP segment headers determined by the network adaptor as a part of the TCP segmentation offload; and
receive a second data transmission request;
cause transmission via the one of the at least one physical interfaces to a network, of a second TCP segment of data for the second data transmission request, wherein the circuitry is capable to cause transmission of the second TCP segment of data such that it follows transmission of the at least the first of the multiple TCP segments of data for the first data transmission request but precedes transmission of at least a last of the multiple TCP segments of data for the first data transmission request.

10. The apparatus of claim 9, wherein the second data transmission request comprises a higher priority request than the first data transmission request.

11. The apparatus of claim 9, further comprising memory and multiple processor cores.

* * * * *